INVENTORS
HARRY R. VAN DEVENTER
BY JOHN J. SHIVELY
Van Deventer & Shively
ATTORNEYS INVENTORS.
HARRY R. VAN DEVENTER
JOHN J. SHIVELY
BY
Van Deventer + Shively
ATTORNEYS INVENTORS
HARRY R. VAN DEVENTER
JOHN J. SHIVELY
BY
Van Deventer & Shively
ATTORNEYS United States Patent Office 2,743,315

Patented Apr. 24, 1956

2,743,315

CONTROL CIRCUITS FOR TELEPHONE ANSWERING AND RECORDING DEVICES

Harry R. Van Deventer and John J. Shively, New York, N. Y., assignors to Telephone Answering and Recording Corporation, New York, N. Y., a corporation of Delaware Application October 23, 1952, Serial No. 316,477

6 Claims. (Cl. 179—6)

This invention relates to control circuits for use in telephone answering and recording devices used at unattended subscriber's stations to automatically answer an incoming call, deliver a message to the calling subscriber and, if desired, record any message said calling subscriber cares to leave.

While described in connection with an ordinary subscriber's line circuit, it will be understood the device can be used with any communication circuit over which speech is recorded and/or transmitted.

The main object of the invention is to provide means whereby the hanging up of the calling subscriber's receiver will automatically disconnect the device from the telephone line circuit at any time during the answering or recording cycle thereof.

Another object is to accomplish the foregoing by the use of a single relay or other device which serves the double purpose of starting the device and stopping same.

Another object is to eliminate some of the relays heretofore necessary in these devices and simplify the circuit heretofore used.

Other objects and advantages will be apparent or are referred to in connection with the following specification and drawings wherein is described by way of illustration preferred embodiments of the invention. However, it will be understood that these disclosures are merely illustrative and not limitative to the invention which is as defined by the appended claims.

Figure 1:
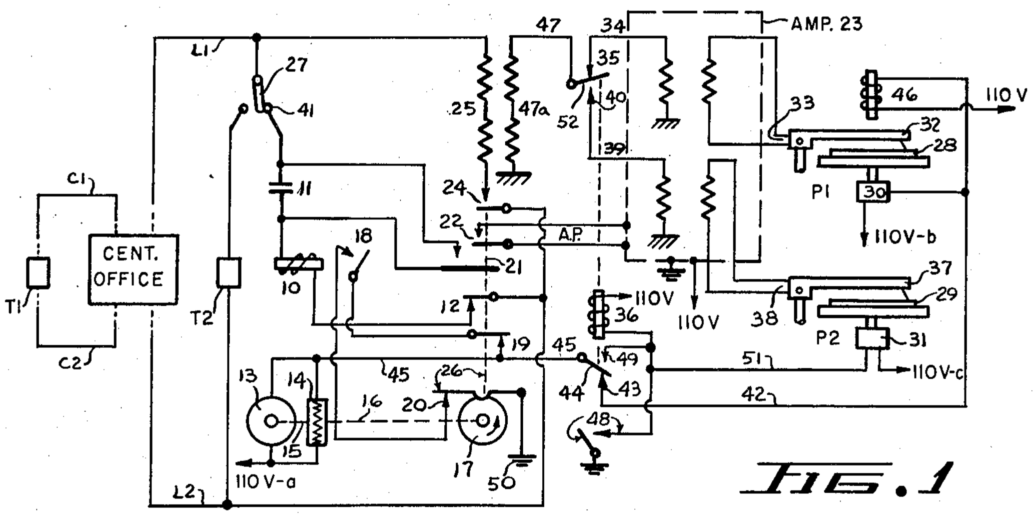
Figure 1 is a diagram of circuits and apparatus illustrating one embodiment of the invention.

It will be understood that in the drawings the power circuit is marked "110 v." and shown grounded on one side for the sake of clarity, but in practice is wired metallic throughout.

The chassis (amplifier) "ground" is also diagrammatically indicated and is also wired metallic where necessary. Also, the amplifier and its power supply is indicated diagrammatically and may be of any desired type.

The motors, timer and other parts are of any desired type, many of which are known.

The phonograph instruments $P^1$, $P^2$, may be of any type—disc, tape or wire—recorder and reproducer, as the instant invention is concerned only with their control which is fully described in connection with the flat disc record type chosen by way of illustration such changes as are necessary to use magnetic recorders and reproducers instead of those shown are obvious to those skilled in the art.

A telephone central office marked "CENT. OFFICE" in the drawings is of any type where the subscriber's lines terminate in the usual manner for interconnection. The switching equipment may be either manual or automatic; the calling line is marked C1, C2, and the called line to which the device is connected is marked L1, L2.

The telephone instruments, T1, T2, on both lines are of the usual type and each includes a transmitter, receiver and bell or ringer. As the type, construction and circuits of these instruments are well known, they are not described in detail.

In connection with the present invention, advantage is taken of the fact that in many systems employing common battery, when two lines are connected through a central office, upon the termination of a conversation when the calling party at telephone T1 hangs up the receiver, a momentary break occurs in the called line L1, L2, connected to the called telephone T2, and to the answering and recording device now to be described.

This momentary break can occur with a manually operated common battery switchboard when the operator disconnects the plugs of a cord circuit from the line jacks of the calling and called line. On some automatic systems the break is caused by the operation of one or more of the relays or other instrumentalities set in motion by the calling subscriber's dialing, the apparatus operating in a well known manner to seize the called line and complete the connection thereto, and afterward—upon the hang-up of the calling telephone—to break the connection.

It is immaterial to a consideration of the instant invention to describe in detail how said momentary interruption of the called line is brought about; it is sufficient to state that upon the occurrence of a momentary break of the called line, or the momentary reduction of current flowing therein to a point where the control relays hereinafter described, will release for a short period, that these relays will operate as hereinafter described.

Referring to Figure 1, the control relay 10 is connected across the telephone line L1, L2, in series with condenser 11 (or other device such as a rare-gas relay) and the normally closed timer contacts 12. The device 11 is opaque to direct current.

The timer may be of any suitable construction and includes a motor 13 and the usual magnetic clutch 14 between the motor shaft 15 and the timer shaft 16, the latter carrying one or more cams 17 for operating the contacts of the timer. As such timers are well known they will not be described in detail except to state that when clutch 14 is deenergized all contacts are automatically reset to normal starting position shown in the drawings.

It will be noted that for clarity, the timer is shown diagrammatically in the figures, one cam (17) being shown. There may be a separate cam for each set of contacts or any other suitable arrangement may be used to open and close the timer contacts in proper sequence.

Relay 10 has normally open contacts 18 connected in series in a power circuit including motor 13 and clutch 14 in parallel, and the normally closed timer contacts 19 and 20 in series therewith.

The timer has a set of normally open contacts 21 connected across condenser 11 to short-circuit the condenser when the timer operates.

Normally open contacts 22 in the timer close the plate or amplifier circuit A. P. to amplifier 23 when the timer is in operation. This also occurs with these same contacts in Figures 2, 3, 4, 5, 6 and 8.

Normally open contacts 24 in the timer close a circuit across line L1, L2, including the winding 25 of a coupling device such as a repeating coil, to connect said device to L1, L2, when the timer is in operation.

The timer mechanism 26 operated by cam 17, mounted on shaft 16, is designed to open normally closed contacts 12, 19 and 20, at the end of some predetermined period—say 60 seconds; during this period contacts 21, 22 and 24, are closed and open when said timer is restored to normal.

A switch 27 may be used to switch the telephone line circuit L1, L2, from telephone T2 to the device, although both the telephone and the device can be on the line L1, L2, at the same time.

A record 28 having a sound recording to be delivered to calling subscriber is placed in phonograph P1 and a record blank 29 is placed in phonograph P2. The phonographs may have motors 30, 31, or are driven by any other suitable means controlled by the control device.

Phonograph P1 is termed the talk-out phonograph, and phonograph P2 the recorder. Phonograph P1 has its translator or pick-up 32 connected to the input circuit 33 of the amplifier 23, the associated output 34 being connected to normally closed contact 35 on relay 36.

Phonograph P2 has its translator or recording element 37 connected to output circuit 38 of amplifier 23, the associated input 39 thereof being connected to normally open contact 40 of relay 36. Switch 27 being closed to contact 41, if a call is made to telephone T2, the incoming A. C. ringing current (usually 20 cycles at 80 volts) will flow through condenser 11 and relay 10 energizing the latter, and closing contacts 18. Each pulse of ringing current is normally followed by full restoration to the telephone line circuit of the D. C. line current, whatever that may be. It is commonly from 24 to 48 volts in automatic exchanges.

When contacts 48 close, it completes the power circuit (via 110 va.–*a*—13—14 conductor 45, contact 19, contact 18, contact 20 to ground at 50), motor 13 and clutch 14 are energized and the timer begins to operate, closing contacts 21 and short-circuiting condenser 11. The direct current flowing in L1, L2, now has a path through relay 10 which therefore remains energized, keeping the timer in operation with contacts 12, 19, 20, open, and contacts 21, 22 and 24 closed.

A circuit is now established from the 110 v. power through motor 30 of the talk-out phonograph 30, via 110 v.–*b*, conductor 42 to the back contact 43 on relay 36 and via contact 44 and conductor 45, timer contact 19, relay contact 18 on relay 10, and timer contact 20 to ground at 50.

A circuit is also established from conductor 42 through relay or control magnet 46 which controls the arm or other member carrying pick-up 32, and lowers same to record 28 (the complete operation of magnet 46 is described in the co-pending application Serial No. 239,733 filed August 1, 1951). This connects the talk-out circuits via conductor 47 to the winding 47*a* of the repeating coil, and via winding 25 thereof the speech is repeated to the calling party at telephone T1.

At the end of the talk-out message, the movement of the arm carrying the pick-up 32 or some other suitable part of phonograph P1 momentarily closes the mid-cycle switch 48, thereby energizing relay 36 which via contact 49 locks itself in circuit with the timer ground at 50 via 20, 18, 19, 45, 49. When relay 36 operates, the circuit through the talk-out phonograph motor 30 and pick-up control magnet 46 is opened at contact 43 (relay 36) and a new circuit is established via contacts 44—49 (relay 36) conductor 51 to motor 31 of the recorder P2 to 110 v.–*c*. At the same time the amplifier circuits are switched by relay 36 at contact 52 thereof, to disconnect the talk-out output 34 and connect the record-input 39 to winding 47*a* of the repeating coil.

The calling party T1 can now speak any message they wish to leave, and same will be recorded on blank 29.

Cam 17 and mechanism 26 of the timer determine the duration of the complete cycle, and when the timer operates to open contact 20, thereby opening one side of the power circuit at 50, clutch 14 will reset all timer contacts to normal. As this opens the shunt (contacts 21) around condenser 11, the condenser is inserted in series with relay 10 which is no longer held closed by the D. C. current in the telephone line. The device is therefore restored to normal position and will not operate until relay 10 is again energized by A. C. ringing current as previously described.

The foregoing description discloses how the device times itself by means of the timer cam 17. If the cam is set to provide a total running time of 60 seconds and the talk-out message consumed 20 seconds before switch 48 is operated, then the recording period would be 40 seconds. Assuming that the calling party only talked 15 seconds—this would mean that for 25 seconds the called lines L1, L2, would be tied up and test "busy" to all incoming calls until the timer released it. Also, the 25 seconds recording space on record 29 would be wasted.

It is, therefore, desirable that the length of time the device operates be governed by the action of the calling party, the timer in the device acting merely to limit the over-all run or length of complete cycle.

This desirable feature is obtained by the arrangement just described. If at any time after the device is started in response to an incoming ring, the calling party hangs up the telephone T1 thereby effecting a momentary break or change in the current flowing in L1, L2, or if an operator or other means causes a momentary break in the called line L1, L2, relay 10 is released, and opens contacts 18. This breaks the power circuit through closed timer contacts 19 and conductor 45 to motor 13 and clutch 14, the latter resetting all timer contacts to normal. As this puts condenser 11 in circuit with relay 10, the latter will no longer operate on D. C. so will not close after the momentary opening of the line circuit if contacts 21 open before the line closes. The characteristics of relay 10 can be so chosen that its contacts 18 operate in such a manner that, upon opening the line circuit, contacts 21 have time to operate.

Figures 2, 3:
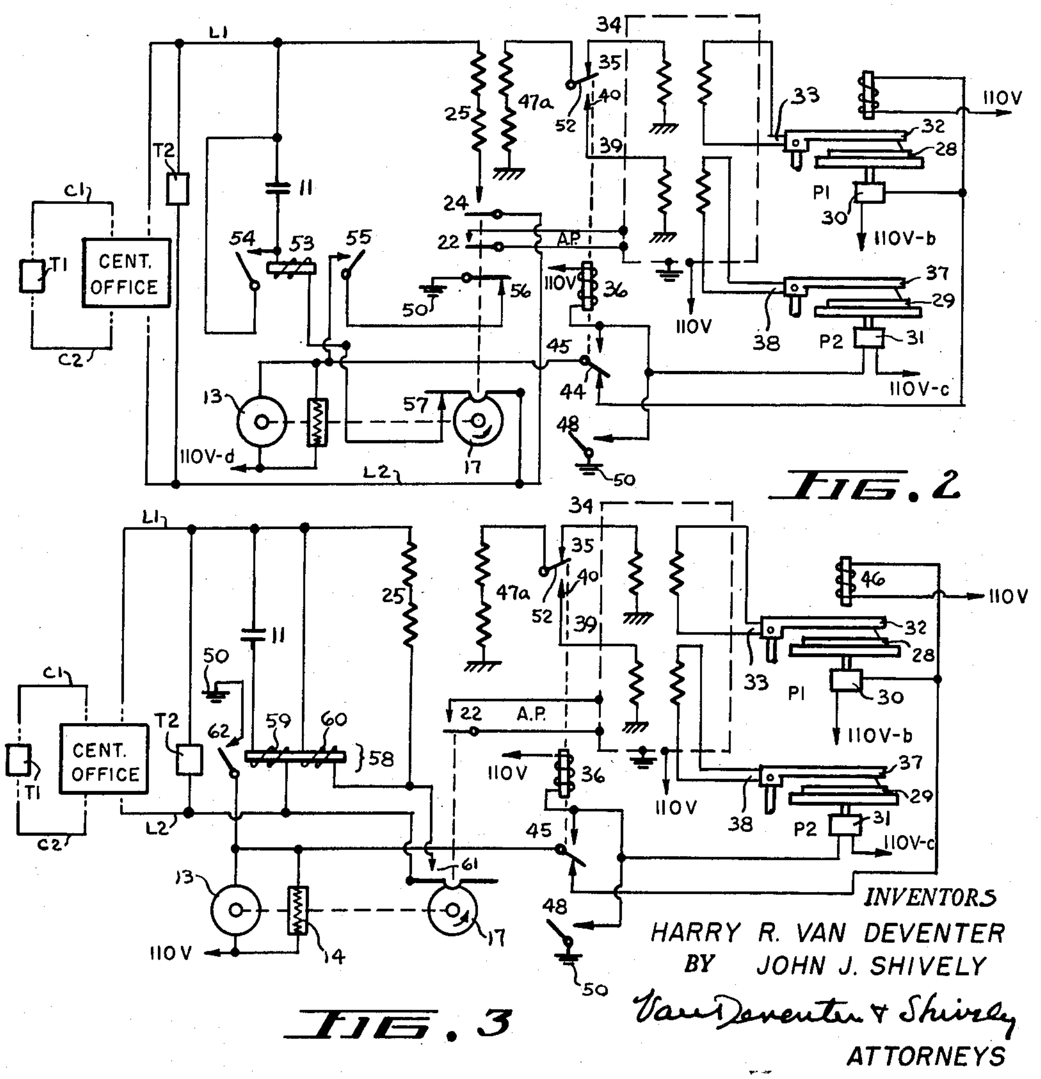
Figures 2, 3, 4 and 5 are modifications of Figure 1.

Figure 2 discloses a modified circuit wherein the control relay 53 has a first pair of contacts 54 which close to short-circuit the condenser 11, operating in this respect like timer contacts 21 previously described.

Relay 53 has a second pair of contacts 55 in series with the power circuit—110 v.–*d*—"ground" at 50—at contacts 56—contacts 55—close and remain closed as long as relay 53 is energized. Timer contacts 57 operate at the end of the cycle period to open the line circuit through relay 53 to cause same to open its contacts and restore the device to normal.

The contacts 54 may be made quick-opening to permit relay 53 to operate on a quick break in the line circuit, and may be made to operate somewhat quicker than contacts 21 in Figure 1. Figure 2 also eliminates two sets of contacts in the timer as compared with Figure 1. In Figure 2, contacts 22 and 24 normally open—close when the timer begins operation, and normally closed contacts 56 and 57 open after the timer has operated for a predetermined period—say 60 seconds.

The operation of the device, Figure 2, is the same as that described in connection with Figure 2 in connection with the operation of relays 36, 46, and the phonographs P1, P2, and their associated circuits.

Figure 3 discloses a further modification wherein the control relay generally denoted by numeral 58 has a first winding 59 in series with condenser 11 across the line L1, L2, from which it is never disconnected. A second winding 60 on relay 58 is connected across line L1, L2, in series with normally open contacts 61 in the timer.

Ringing current flowing in the line, will flow through winding 59, and relay 58 will close contacts 62. This connects side (50) of the power circuit to motor 13 and clutch 14 (to 110 v.) and the timer contacts 61 close, putting the winding 60 of relay 58 across L1, L2, and keeping relay 58 closed by the D. C. line current.

If the timer cam 17 operates to break contact 61, the circuit through the holding winding 60 is opened and relay 58 opens its contacts 62, opening the motor and clutch circuit, and the timer resets to normal.

If the L1, L2, circuit is interrupted, relay 58 opens contact 62 and the timer resets, opening the holding winding at 61.

The advantage of the arrangement shown in Figure 3 is the necessity of only two sets of timer contacts and one set (62) of relay contacts. In Figure 3, contacts 22—normally open—close when the timer begins operation and remain closed while the timer operates for a predetermined period—say 60 seconds. The operation of relays 36, 46, and phonographs P1, P2, and their associated circuits, is the same as described in connection with the preceding figures.

Figure 4:
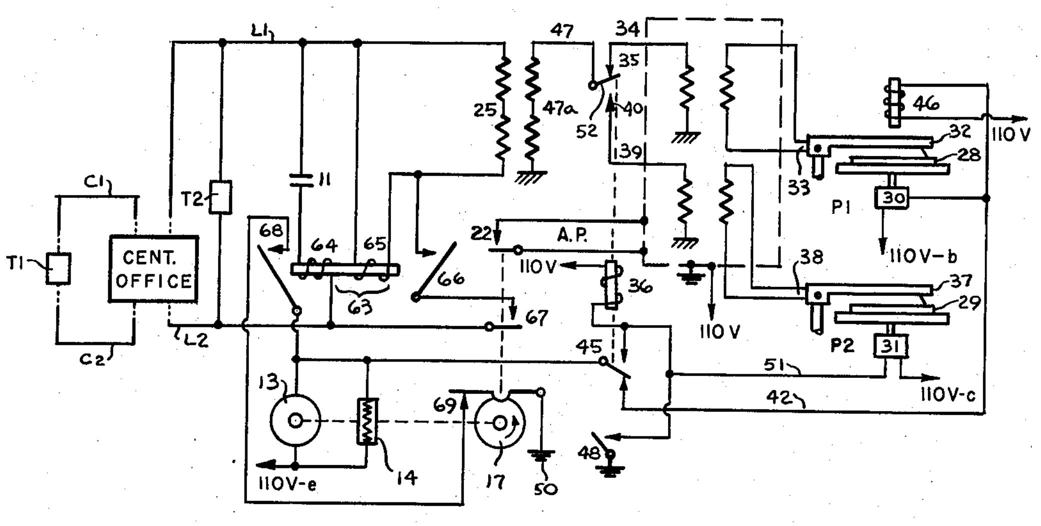

Figure 4 discloses a further modification where the line circuit L1, L2, is not brought down to the timer contacts which is objectionable with some types of apparatus. In Figure 4 the control relay, generally indicated at 63, has its A. C. winding 64 connected and operating like winding 59, Figure 3, previously described. The holding winding 65 is connected for operation across L1, L2, via normally open contacts 66 in relay 63 and 67 in the timer.

The power circuit through relay 63 is taken in series from "110 v.-*e*" through motor 13 and clutch 14 to contacts 68 on relay 63 and the normally closed contact 69 to power circuit at "50". Here, if the timer contacts 69 open at the end of the cycle, the timer restores as previously described, contact 67 opening to release the relay 63 via contact 66.

Also, if relay 63 drops out because of a break in the line prior to the operation of the timer, when contact 68 on relay 63 opens, the motor and clutch circuit is opened and the timer resets to normal. The relays 36, 46, and phonographs P1, P2, and their associated circuits, operate as previously described.

In Figure 4, contacts 22 and 67 normally open—close when the timer begins operation and normally closed contacts 69 open after the timer has operated for a predetermined time—say 60 seconds.

Figure 5:
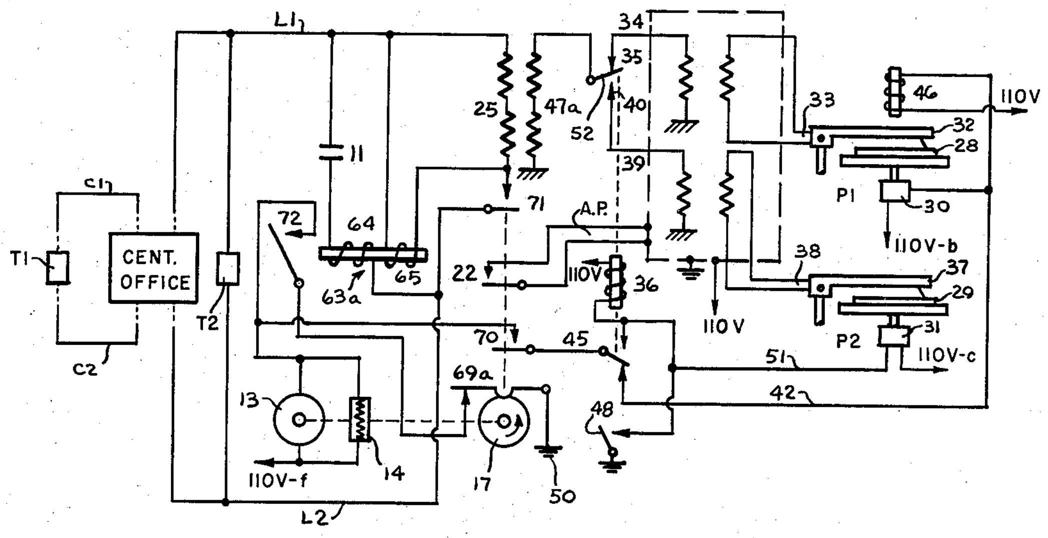

Figure 5 shows a modification wherein contacts 66, Figure 4, are omitted. Also, the load on contacts, such as 68 Figure 4, due to motors 30, 31, and magnet 46, are taken on a timer contact 70. The control relay 63*a* has the same A. C. winding 64 operating as described in connection with Figure 4. Winding 65 (Figure 5) is across L1, L2, in series with normally open timer contacts 71.

Upon A. C. actuation, relay 63*a* closes contacts 72 which complete the power circuit "110 v.-*f*" through motor 13 and clutch 14 through normally closed timer contacts 69*a* to "ground" at 50, so that the contacts 72 and 69*a* only carry the load of motor 13 and clutch 14. Contact 70 then extends the power circuit to motors 30, 31, and magnet 46 as previously described.

Contact 70 may close after and open before contacts 69*a* operate. Should relay 63*a* drop out, due to a break in L1, L2, contacts 72 operate to break the power circuit through motor 13 as previously described, and the device resets to normal. The relays 36—46, and phonographs P1, P2, and their associated circuits, operate as previously described.

In Figure 5, contacts 22, 70 and 71 normally open—close when the timer begins operation and contacts 69*a* (normally closed) open while the timer operates for a predetermined time—say 60 seconds.

Figure 6:
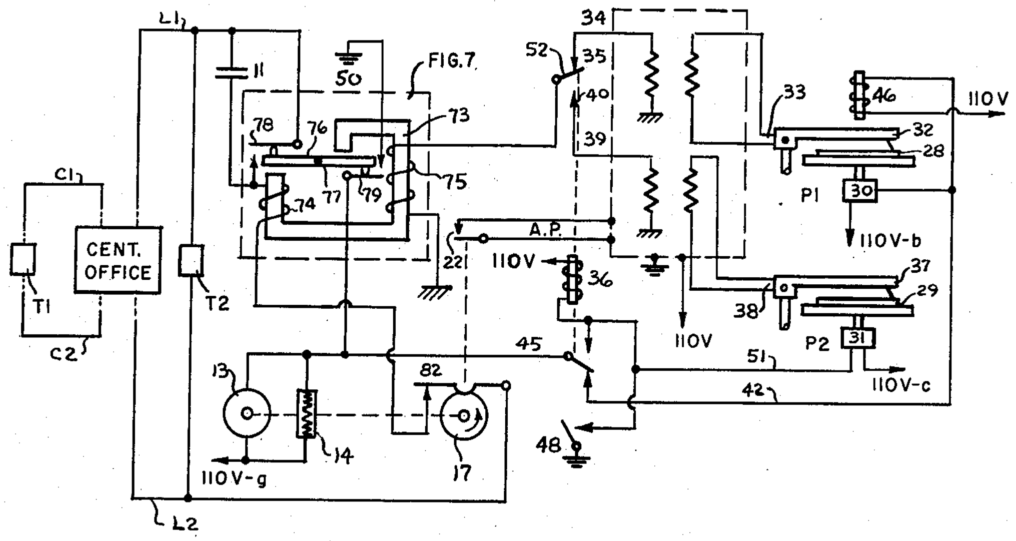
Figure 6 is a diagram of a circuit embodying the invention and using a combined repeating coil and relay unit.

In Figure 6 is shown a modification in which the repeating coil windings 25, 47*a*, shown in the preceding figures are combined with the structure of the control relay to form a unit therewith. Here the core of the relay is combined with the core of the repeating coil and is shown diagrammatically at 73. On the legs of this core or inductively associated therewith in any suitable manner are the windings 74, 75, which, so far as repeating coil or coupling action are concerned, functionally correspond to windings 25, 47*a*, previously described.

Winding 74 is designed and proportioned to act as an A. C. winding in series with condenser 11. Winding 75 is designed and proportioned to cooperate with winding 74 for proper speech coupling.

The unit has an armature 76 pivoted or otherwise supported at 77 to close and at least partially bridge the gap between the upstanding pole pieces of the core; and said armature when energized, closes two pairs of contacts 78, 79. The unit may be mounted on a base 80 and provided with a suitable magnetic shield or cover 81, shown in section in Figure 7 and enclosing said unit.

The unit being connected as shown in Figure 6, incoming ringing current on L1, L2, will flow through condenser 11 and winding 74 and through normally closed contact 82 on the timer. Winding 74 energizes core 73 and armature 76 moves to close contacts 78 which short circuit condenser 11 and afford a path for D. C. current through coil 74 which is now directly across the line L1, L2, in series with contacts 78 and contact 82. Contacts 78, 79, are now closed. Contacts 79 establish a power circuit from "110 v.-*g*" through motor and clutch and contacts 79 to "ground" at 50 and the timer begins to operate.

If the timer operates at the end of the cycle, when contacts 82 open, the unit 73 will release its contacts as the circuit through winding 74 is broken and the device resets, the power circuit being broken at 79.

If during the cycle, the line L1, L2, breaks, the unit 73 releases its contacts as the circuit through winding 74 is opened, the power circuit being broken at contacts 79. The operation of relays 36 and 46 and phonographs P1, P2, and their associated circuits, are the same as previously described.

In Figure 6, contacts 22 normally open—close when the timer begins operation, and contacts 82 normally closed, open after the timer has been in operation for a predetermined period—say 60 seconds.

Figures 7, 8:
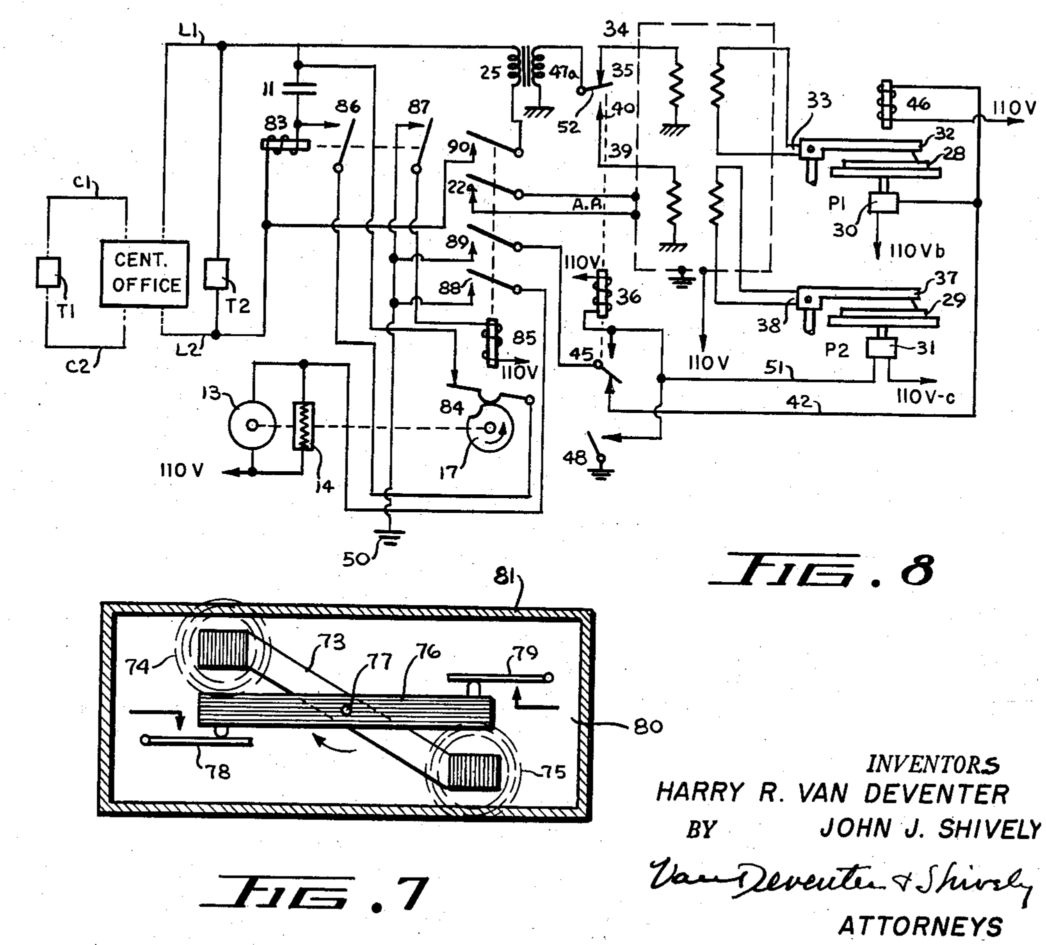
Figure 7 is a detail of the combined repeating coil and relay used in Figure 6.
Figure 8 is a diagram of an alternate form of control circuit employing a second relay to control the operating circuits conjointly with a control relay such as described in connection with Figure 2.

Figure 8 discloses a modification of the control circuits which has the advantage that the control relay 83 has a single winding and the timer a normally closed contact 84, a second relay 85 being employed to control the timer motor 23 and clutch 14 and the coupling means such as the repeating coil 25, 47*a*.

Here there is a first circuit including the L-1 side of the communication circuit, the condenser 11, the winding of the relay 83, and the remaining side L-2 of the communication circuit.

There is a second circuit serially including the condenser 11, a first pair of contacts 86 on the relay 83, and the normally closed contacts 84 in the timer.

The second relay 85 is serially included in a third circuit, including the "110 v." source of power, and a second pair of normally open contacts 87 on the control relay 83.

There is a first pair of normally open contacts 88 on said second relay 85 which are serially included in a fourth circuit together with motor 13, clutch 14, and the "110 v." source of power.

A phonograph P1 has its motor 30 connected in a fifth circuit serially including a source of power and the normally open contacts 89 on relay 85.

The talking circuit of the phonograph P1 is connected via a sixth circuit with the coupling means 25, 47*a*, and the normally open contacts 90 on relay 85.

In operation ringing current being applied to the communication circuit L1, L2, will pass through condenser 11 and operate relay 83, which, upon closing of its contacts 86, short-circuits the condenser via timer contacts 84, and thereby affords a path for direct current through the relay 83 which therefore closes its contacts 86—87. The closing of contacts 87 operates relay 85 in a manner that is obvious from the diagram, thereby connecting the coupling means 25, 47*a*, to the communication circuit via contacts 90.

When contacts 89 on relay 85 close, the motor of the phonograph P1 operates and the recorded speech therein is transmitted to the communications line. If the device is also to record an incoming message, at the end of the talkout period the mid-cycle switch 48 is operated, thereby switching from phonograph P1 to phonograph P2 so that any message spoken at the distant telephone T–1 may be recorded on the record 29 at phonograph P2.

If the user at the telephone T1 hangs up the receiver thereby causing a momentary break in the line circuit L1, L2, relay 83 will open its contacts 86, 87, at any time during the talk-out or recording period, thereby releasing relay 85 which via contacts 88 opens the circuit through the timer motor 13 and clutch 14, resetting the device to normal.

If on the other hand the party at the telephone T1 does not hang up the receiver within the period determined by the operation of cam 17, contacts 84 on the timer will be momentarily opened at the end of the pre-set period, which will break the shunt around the condenser 11, thereby rendering the winding of relay 82 opaque to the passage of direct current so that the contacts 86 and 87 thereof remain open, opening the circuit to relay 85, which is released and the device is restored to normal, as previously described, ready for the next call.

In Figure 8 the normally closed contacts 84 open after the timer has been in operation for a predetermined period—say 60 seconds. In this figure, it will be observed that the plate circuit AP of the amplifier is closed on contacts 22*a* of relay 85.

It will be seen that the devices described herein is controlled in two ways—first, by the line condition, and secondly, by the timer. Should something occur so that the control relays shown in the figures are not released, they will be released by the operation of the timer after a predetermined period. The danger of having the device controlled solely by the control relay is therefore eliminated.

What is claimed is:

1. In combination with a communication circuit, a control circuit for telephone answering and recording devices including a motor; a timer mechanism having contacts; an electrically operated clutch between said motor and timer adapted when energized to connect said timer to said motor for operation thereby, said clutch when deenergized permitting said timer to return to normal starting position; a condenser; means including contacts operated conjointly with the actuation of said timer serially included in circuit with said condenser and adapted upon closure to provide a shunt path for direct current from said communication circuit to flow past said condenser; a control relay having a winding; a circuit serially including said communication circuit, said condenser, said winding, and a pair of normally closed contacts in said timer; normally open contacts on said relay; a circuit including a source of current, said motor, said clutch, said normally open contacts on said relay and a pair of normally closed contacts in said timer.

2. In combination with a communication circuit, a motor; a timer mechanism having contacts; an electrically operated clutch between said motor and timer adapted when energized to connect said timer to said motor for operation thereby, said clutch when deenergized permitting said timer to return to normal starting position; a control relay having a winding; a condenser; a first pair of normally open contacts on said relay; a circuit including said first pair of contacts and said condenser whereby same will be short-circuited upon closure of said contacts; a circuit serially including said communication circuit, said condenser, said winding and a pair of normally closed contacts in said timer; a second pair of normally open contacts on said relay; a circuit including a source of current, said motor, said clutch, said second pair of contacts and a pair of normally closed contacts in said timer; a phonograph; and coupling means controlled by said timer and adapted while said timer is operating to connect said phonograph to said communication circuit.

3. In combination with a communication circuit, a motor; a timer mechanism having contacts; an electrically operated clutch between said motor and timer adapted when energized to connect said timer to said motor for operation thereby, said clutch when deenergized permitting said timer to return to normal starting position; a condenser; a control relay having a first winding; said relay having normally open contacts; a circuit including said communication circuit, said condenser and said first winding; a second winding on said relay; a circuit including said communication circuit, said second winding and normally open contacts on said timer; a circuit including a source of current, said motor, said clutch and said normally open contacts on said control relay; a phonograph; and coupling means controlled by said timer and adapted while said timer is operating to connect said phonograph to said communication circuit.

4. In combination with a communication circuit; a motor; a timer mechanism having contacts; an electrically operated clutch between said motor and timer adapted when energized to connect said timer to said motor for operation thereby, said clutch when deenergized permitting said timer to return to normal starting position; a condenser; a control relay having a first winding; said relay having normally open contacts; a circuit including said communication circuit, said condenser and said first winding; a second winding on said relay; a second pair of normally open contacts on said relay; a circuit including said communication circuit, said second winding, said second pair of contacts and a pair of normally open contacts on said timer; a circuit including a source of current, said motor, said clutch, said first-mentioned contacts on said control relay and a pair of normally closed contacts in said timer; a phonograph; and coupling means controlled by said timer and adapted while said timer is operating to connect said phonograph to said communication circuit.

5. In combination with a communication circuit, a motor; a timer mechanism having contacts; an electrically operated clutch between said motor and timer adapted when energized to connect said timer to said motor for operation thereby, said clutch when deenergized permitting said timer to return to normal starting position; a condenser; a control relay having a winding and a first pair and a second pair of normally open contacts; a first circuit connected to one side of said communication circuit and serially including said condenser and said winding and connected to the remaining side of said communication circuit; a second circuit serially including said condenser, said first pair of contacts on said relay and normally closed contacts in said timer; a second relay having a winding and contacts; a source of current; a third circuit serially including said source of current, said second pair of contacts on said control relay and said winding of said second relay; a first pair of normally open contacts on said second relay; a fourth circuit serially including said last contacts, said motor, clutch and source of current; a phonograph having a motor; a fifth circuit serially including said last motor and a pair of normally open contacts on said second relay; coupling means to couple said phonograph to said communication circuit; and a sixth circuit serially including said coupling means, normally open contacts on said second relay and said communication circuit.

6. In combination with a telephone system having a pair of conductors and including means to maintain a direct current potential across said conductors and means to impress an alternating potential thereon, in combination, a condenser, a relay having a coil connected in series with said condenser across said line conductors, a pair of normally open contacts on said relay and connected to opposite sides of said condenser whereby closure thereof by said relay in response to said alternating current through said coil and condenser may bridge said direct current potential on said coil, a telephone answering device operatively associated with said line conductors, a source of current independent of said line circuit and adapted to actuate said answering device, and a second pair of normally open contacts on said relay adapted upon closure thereby to opertively connect said independent source of current to said answering device.

References Cited in the file of this patent

UNITED STATES PATENTS

| | | |
|---|---|---|
| 2,537,407 | Handschin | Jan. 9, 1951 |
| 2,709,202 | Handschin | May 24, 1955 |